United States Patent
Majumdar et al.

(10) Patent No.: US 9,600,018 B1
(45) Date of Patent: Mar. 21, 2017

(54) CLOCK STOPPAGE IN INTEGRATED CIRCUITS WITH MULTIPLE ASYNCHRONOUS CLOCK DOMAINS

(71) Applicant: Xilinx, Inc., San Jose, CA (US)

(72) Inventors: Amitava Majumdar, San Jose, CA (US); Balakrishna Jayadev, San Jose, CA (US); Ismed D. Hartanto, Castro Valley, CA (US)

(73) Assignee: XILINX, INC., San Jose, CA (US)

( * ) Notice: Subject to any disclaimer, the term of this patent is extended or adjusted under 35 U.S.C. 154(b) by 52 days.

(21) Appl. No.: 14/300,159

(22) Filed: Jun. 9, 2014

(51) Int. Cl.
*G06F 1/00* (2006.01)
*G06F 1/12* (2006.01)
*G06F 1/06* (2006.01)
*G06F 1/10* (2006.01)

(52) U.S. Cl.
CPC .............. *G06F 1/00* (2013.01); *G06F 1/06* (2013.01); *G06F 1/10* (2013.01); *G06F 1/12* (2013.01)

(58) Field of Classification Search
CPC ..... G06F 1/00; G06F 1/10; G06F 1/12; G06F 1/04; G06F 1/06; G06F 1/14
See application file for complete search history.

(56) References Cited

U.S. PATENT DOCUMENTS

| | | | | |
|---|---|---|---|---|
| 4,755,704 A * | 7/1988 | Flora | ......................... | G06F 1/10 327/152 |
| 6,320,436 B1 * | 11/2001 | Fawcett | ..................... | G06F 1/10 327/158 |
| 8,803,554 B2 * | 8/2014 | Langadi | ..................... | G06F 1/08 326/93 |
| 2008/0258794 A1 * | 10/2008 | Gao | .......................... | G06F 1/04 327/298 |
| 2009/0039940 A1 * | 2/2009 | Hong | ........................ | G06F 1/10 327/298 |
| 2014/0223220 A1 * | 8/2014 | Guntur | ...................... | G06F 1/12 713/501 |

* cited by examiner

*Primary Examiner* — Jung Kim
(74) *Attorney, Agent, or Firm* — Kin-Wah Tong; Robert M. Brush

(57) ABSTRACT

Methods and circuits for performing a clock-stop process of a circuit are disclosed. For example, a circuit includes a clock group having a first clock domain, a first clock multiplexer, a first synchronizer and a controller. The controller is configured to initiate a clock stop process of the circuit by sending an alternative mode signal to the first synchronizer. The first synchronizer is configured to synchronize the alternative mode signal to a clock of the first clock domain and is further configured to output, to a select line of the first clock multiplexer, the alternative mode signal that is synchronized to the clock of the first clock domain. The select line of the first clock multiplexer is for selecting from between an input of the first clock multiplexer for the clock of the first clock domain and an alternative clock input of the first clock multiplexer for an alternative clock signal from the controller.

16 Claims, 8 Drawing Sheets

CLOCK STOPPAGE IN INTEGRATED CIRCUITS WITH MULTIPLE ASYNCHRONOUS CLOCK DOMAINS

FIELD OF THE INVENTION

The present disclosure relates generally to stoppage of clocks for debugging integrated circuits, and more particularly to devices and methods to stop multiple internal clocks with different levels of determinism that can be controlled by a user.

BACKGROUND OF THE INVENTION

A well-known method for silicon debug is clock-stop and scan-dump (CSSD), in which an application (e.g., one that is known to cause failures) is run as if in normal functional mode. At a pre-determined point in time, or at a time when a specific event occurs, clocks are stopped, and once the chip is known to be quiescent, the flip-flops ("FFs") in the design are configured into one or more shift-registers, called "scan-registers" (usually by asserting a "scan-enable" signal). A scan-clock, which may run at a user-defined frequency, is used next to shift out, or "dump" the contents of the FFs for analysis. This is generally performed for a single clock domain or a sub-domain with varying levels of determinism. For example in a graphics processing unit ("GPU") or central processing unit ("CPU"), most of the FFs are in a single large clock domain. During debug, the clock is stopped at its root, e.g., at the output of the phase locked loop ("PLL"), before shifting out contents of the FFs. However, in the presence of multiple asynchronous clock domains, stopping one clock domain deterministically may not guarantee enough debug information and may not allow scan-based shifting of FFs in the domain of the clock that was stopped. In addition, stopping a single large clock domain at its root may cause voltage transients in the power-grid and cause one or more FFs in the design to lose their debug information content.

SUMMARY OF THE INVENTION

In one example, the present disclosure provides a circuit that can include a clock group, the clock group including, a first clock domain, a first clock multiplexer and a first synchronizer. The circuit can also include a controller that is configured to initiate a clock stop process of the circuit by sending an alternative mode signal to the first synchronizer. In one example, the first synchronizer is configured to synchronize the alternative mode signal to a clock of the first clock domain, and to output, to a select line of the first clock multiplexer, the alternative mode signal that is synchronized to the clock of the first clock domain. In one example, the select line of the first clock multiplexer is for selecting from between an input of the first clock multiplexer for the clock of the first clock domain and an alternative mode clock input of the first clock multiplexer for an alternative mode clock signal from the controller.

In various examples: the at least a first clock domain comprises a plurality of state elements that is configurable into a scan chain when the controller asserts a scan enable signal; the controller is further configured to assert an alternative mode clock signal on the alternative mode clock input of the first clock multiplexer to output a content of the scan chain; the clock group further comprises a second clock domain, a second clock multiplexer and a second synchronizer; the second synchronizer is configured to receive the alternative mode signal from the first synchronizer and to synchronize the alternative mode signal to a clock of the second clock domain; the second synchronizer is further configured to output, to a select line of the second clock multiplexer, the alternative mode signal that is synchronized to the clock of the second clock domain; the select line of the second clock multiplexer is for selecting from between an input of the second clock multiplexer for the clock of the second clock domain and an alternative mode clock input of the second clock multiplexer for the alternative mode clock signal from the controller; the first clock domain and the second clock domain comprise a plurality of state elements; the plurality of state elements is configurable into a scan chain when the controller asserts a scan enable signal; the controller is further configured to assert an alternative mode clock signal on the alternative mode clock input of the first clock multiplexer and on the alternative mode clock input of the second clock multiplexer to output a content of the scan chain; the controller is further configured to receive the alternative mode signal when a clock of a last clock domain of the clock group has been stopped, to indicate that all clocks of the clock group have been stopped; the controller is further configured to assert an alternative mode configuration signal and an alternative mode clock signal when the alternative mode signal is received by the controller; the clock group is a first clock group of a plurality of clock groups; the circuit further includes a plurality of programmable flip-flops; the controller is further configured to select at least one of plurality of programmable flip-flops, where a selection of the at least one of the plurality of programmable flip-flop is for choosing a sub-set of clock groups at least including the first clock group of the plurality of clock groups for which clocks are to be stopped first during the clock-stop process; each of the plurality of clock groups comprises an output port for outputting a signal to indicate that clocks within the each of the plurality of clock groups have been stopped; the circuit further includes a gate configured to output to the controller a signal indicating that all clocks within each of the plurality of clock groups have been stopped when the gate receives the signal from each of the plurality of clock groups indicating that the clocks within each of the plurality of clock groups have been stopped; the plurality of clock groups comprise a plurality of state elements; the plurality of state elements is configurable into a scan chain when the controller asserts a scan enable signal; and, the controller is further configured to assert the scan enable signal when the controller receives the signal from the gate indicating that all clocks within each of the plurality of clock groups have been stopped.

The present disclosure also provides a method for performing a clock-stop process of a circuit. For example, the method can include initiating the clock-stop process of the circuit by: providing an alternative mode signal by a controller of the circuit, synchronizing the alternative mode signal to a clock of a first clock domain of a clock group, and forwarding the synchronized alternative mode signal to a clock multiplexer of the first clock domain to select an alternative clock input.

In various examples: the method further includes sending, by the controller, an alternative mode configuration signal to the circuit and asserting, by the controller, an alternative mode clock signal on the alternative mode clock input of the clock multiplexer of the first clock domain to perform an alternative mode operation; the alternative mode configuration signal comprises a scan enable signal, wherein the scan enable signal configures a plurality of state elements in the circuit into a scan chain, and wherein the alternative mode operation comprises scanning out a content of the scan chain; the scan chain includes state elements of the first clock domain and state elements of a second clock domain of the clock group; the method further includes synchronizing the alternative mode signal to a clock of a second clock domain of the clock group and forwarding the alternative mode signal that is synchronized to the clock of the second clock domain to a clock multiplexer of the second clock domain to select an alternative mode clock input of the clock multiplexer of the second clock domain, where the forwarding further comprises asserting an alternative mode clock signal on the alternative mode clock input of the clock multiplexer of the second clock domain; the method further includes forwarding the alternative mode signal back to the controller when a clock of a last clock domain in the clock group has been stopped, to indicate that all clocks in the clock group have been stopped; and, an alternative mode configuration signal and the alternative mode clock signal are asserted after the alternative mode signal is received by the controller.

The present disclosure also provides an additional circuit that can include a controller for controlling a clock-stop process of the circuit, a plurality of clock groups, each of the plurality of clock groups including at least one clock, a plurality of programmable flip-flops, each of the plurality of programmable flip-flops associated with a respective one of the plurality of clock groups, and a plurality of multiplexers, where each of the plurality of multiplexers is associated with a respective one of the plurality of clock groups and with a respective one of the plurality of programmable flip-flops. In one example, each of the plurality of multiplexers includes an input for a signal from a different one of the plurality of clock groups indicating that clocks in the different one of the plurality of clock groups have been stopped and an input for an alternative mode signal from the controller. In addition, in one example the controller is configured to initiate the clock-stop process of the circuit by selecting at least one of the plurality of programmable flip-flops, where a selection of the at least one of the plurality of programmable flip-flops selects a first sub-set of the plurality of clock groups in which clocks are to be stopped first during the clock-stop process.

In various examples: clocks in additional clock groups of the plurality of clock groups are configured to be stopped in a predetermined order following a stopping of the clocks in the first sub-set of the plurality of clock groups; and, when the at least one of the plurality of programmable flip-flops is selected, for each programmable flip-flop that is selected an associated multiplexer of the plurality of multiplexers is configured to select the input of the associated multiplexer for the alternative mode signal.

Other features will be recognized from consideration of the Detailed Description and Claims, which follow.

BRIEF DESCRIPTION OF THE DRAWINGS

Accompanying drawings show exemplary circuits and methods in accordance with one or more aspects of the disclosure; however, the accompanying drawings should not be taken to limit the disclosure to the examples shown, but are for explanation and understanding only.

To facilitate understanding, identical reference numerals have been used, where possible, to designate identical elements that are common to the figures.

DETAILED DESCRIPTION

Figure 1:
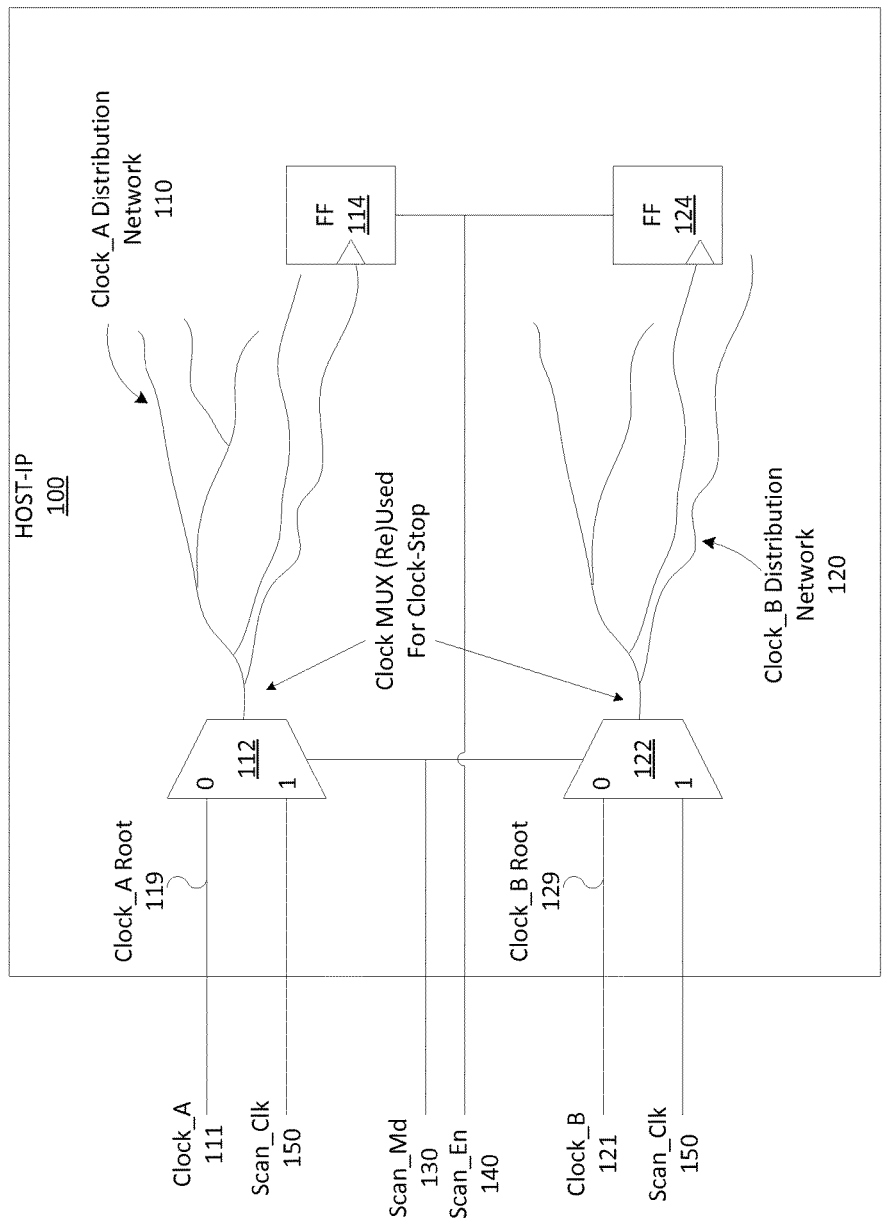
FIG. 1 illustrates a block diagram of a device, or circuit according to one example of the present disclosure.

A method for silicon debug is scan-dump, or clock-stop scan-dump (CSSD), where the chip's clocks are stopped, state elements are configured in one or more scan chains, and the contents of the state elements are shifted (scanned) out through scan-ports. In the presence of multiple asynchronous clock domains, it is not generally possible to stop all clocks at the same time because the notion of time is different for different clocks. Examples of the present disclosure stop multiple internal clocks inside a chip with different levels of determinism that can be controlled by the user. For instance, examples of the present disclosure define multiple clock domains, as well as multiple clock groups, in which the clocks are configured to be stopped in a user-defined order. At the level of a clock group, the order in which clocks are to be stopped may be pre-configured in hardware. However, the order in which various clock groups are stopped may be configured and re-configured on a case-by-case basis.

In one example of the present disclosure, a clock-stop (CS) controller is instantiated inside a circuit. The CS controller may run off any one of the functional clocks of the circuit and may assert an alternative mode signal in order to stop various clocks in the circuit in a predetermined order and assert an alternative mode control sequence, or signal (e.g., a scan-enable signal in order to configure state elements into a scan chain (or a plurality of scan chains)). The CS controller may further assert an alternative mode clock signal (e.g., a scan clock signal in order scan-out the contents of the scan chain(s)). It should be noted that a "functional clock", as referred to herein, is any clock that is used for operation of circuit elements at a time prior to a clock stop process in accordance with the present disclosure. Thus, functional clocks may include test clocks or other clocks which may be implemented when the circuit is not in a standard operating mode. In one example, the clock is selected via a programmable FF. In addition, in one example the alternative mode signal is synchronized to each of the clocks which are to be stopped as each of the clocks is stopped in sequence. Thus, while different clocks in the circuit are not stopped simultaneously, such clocks are stopped in an order which is known in advance, thereby providing greater determinism and less risk of loss of data in the state elements. These and other aspects of the present disclosure are discussed in greater detail below.

Silicon debug is the complex process of starting with a failing application, possibly at a system level, to determining its root-cause, narrowing it down potentially to the errant transistors or even polygons. This process necessarily takes many steps, e.g., first isolating it down to a failing chip, then a failing pin, or pins, on the chip, failing block(s), failing clock(s), failing power domain(s), failing FF(s), failing gate(s) or path(s) and finally the root-cause transistor(s) or polygon(s). In this regard, several tools are commonly used to aid in the analysis. One such tool is the clock-stop scan-dump (CSSD), which is useful around the point when the root-cause has been narrowed down to a few blocks, clock domains or power domains. It is expected at this point that these individual components (i.e., an intersection of appropriate blocks, clock domains and power domains) can then be probed to obtain a detailed visibility into the contents of state elements in these components.

CSSD is generally performed for a single clock domain or a sub-domain where the clock is stopped at its root (e.g., at the output of the phase locked loop ("PLL")) before shifting out contents of the state elements. However, in the presence of multiple asynchronous clock domains, stopping one clock domain deterministically may not guarantee enough debug information. Furthermore, since the mechanism for observing contents of FFs in the single clock domain is through scan-shift, stopping one clock may not guarantee connectivity of the scan chain to an external output port. Therefore, it may be necessary to stop more than one clock domain before scan shifting FFs in one domain. The domains that need to be stopped may be determined by scan chain connectivity. In addition, stopping a single large clock domain at its root may cause voltage transients in the power-grid resulting in one or more state elements in the design to lose their debug information content. Consequently, examples of the present disclosure define multiple clock domains, as well as multiple clock groups, which are configured to be stopped in a user-defined order. Although various examples provided herein relate to a clock-stop scan-dump (CSSD) process, the present disclosure is broadly applicable to deterministic stoppage of clocks for any purpose, including CSSD, real-time monitoring, and so forth.

In general, a clock root is associated with each clock distribution network, or clock domain of an integrated circuit, or intellectual property (IP) core. The clock root is usually at the clock's entry point (input port) into the circuit if it is an external clock, or it is the output of a clock generator circuit (such as a phase-locked-loop (PLL)) for an internally generated clock. In accordance with the present disclosure, it is assumed that the leaf-level nodes of a clock distribution network are delay (skew) balanced with respect to each other (i.e., an insertion delay from clock root to leaf nodes is balanced). If they are not delay-balanced then they are considered different clock distribution networks, albeit with the same clock root.

Clock distribution networks typically have a clock-multiplexer, or "clock-MUX" at each root for scan-shifting. FIG. 1 illustrates this concept for a host intellectual property ("IP") or circuit 100 having two clocks 111 and 121 (also referenced as "Clock_A" and "Clock_B" respectively). In particular, circuit 100 includes two clock distribution networks 110 and 120 with clock roots 119 and 129 respectively. At each clock root is a respective multiplexer 112, 122. A scan mode signal 130 ("Scan_Md") selects which input signal to each of the multiplexers 112 and 122 is output. For example, if Scan_Md 130 is '0', Clock_A 111 may be selected for an output of the clock-MUX 112.

However, if Scan_Md 130 is '1', then the scan clock 150 ("Scan_Clk") may be selected. Scan_Md 130 also controls clock-MUX 122 in a similar manner to select Clock_B 121 if '0' and Scan_Clk 150 if a '1'. Scan_Clk 150 may be used to cycle the circuit 100 through a determined number of clock cycles, possibly at a lower clock rate than Clock_A 111 and/or Clock_B 121 for purposes of a scan dump.

It should be noted that Scan_Clk 150 may be held (not cycled) indefinitely at the preference of a user, or for a fixed amount of time prior to cycling for the scan dump. In this regard, a scan enable signal 140 ("Scan_En") may be used to configure or switch all or a portion of the state elements/FFs in circuit 100 into a scan chain. Although only two flip-flops, 114 and 124 (one in each clock distribution network 110 and 120), are shown, those skilled in the art will appreciate that each distribution network may include a larger number of state elements/flip-flops, which are configured into typically one large scan chain for scan-dump. Scan_Clk 150 may then be cycled for a number of cycles, e.g., up to the number of state elements in the scan chain, to serially output, bit-by-bit, the contents of the state elements in the scan chain. Notably, the clock-MUXs 112, 122 may be re-used for clock-stop operations in accordance with the present disclosure, as described in greater detail below.

It should also be noted that usage of the circuit 100 is not limited to CSSD operations, but is broadly applicable to any manner of clock stoppage. Thus, although various components of circuit 100 and various signals are described as relating to "scan", it should be understood that such labels are used for illustrative purposes only. For example, Scan_Clk 150 may comprise any clock that is an alternative to Clock_A 111 and/or Clock_B.

Figure 2:
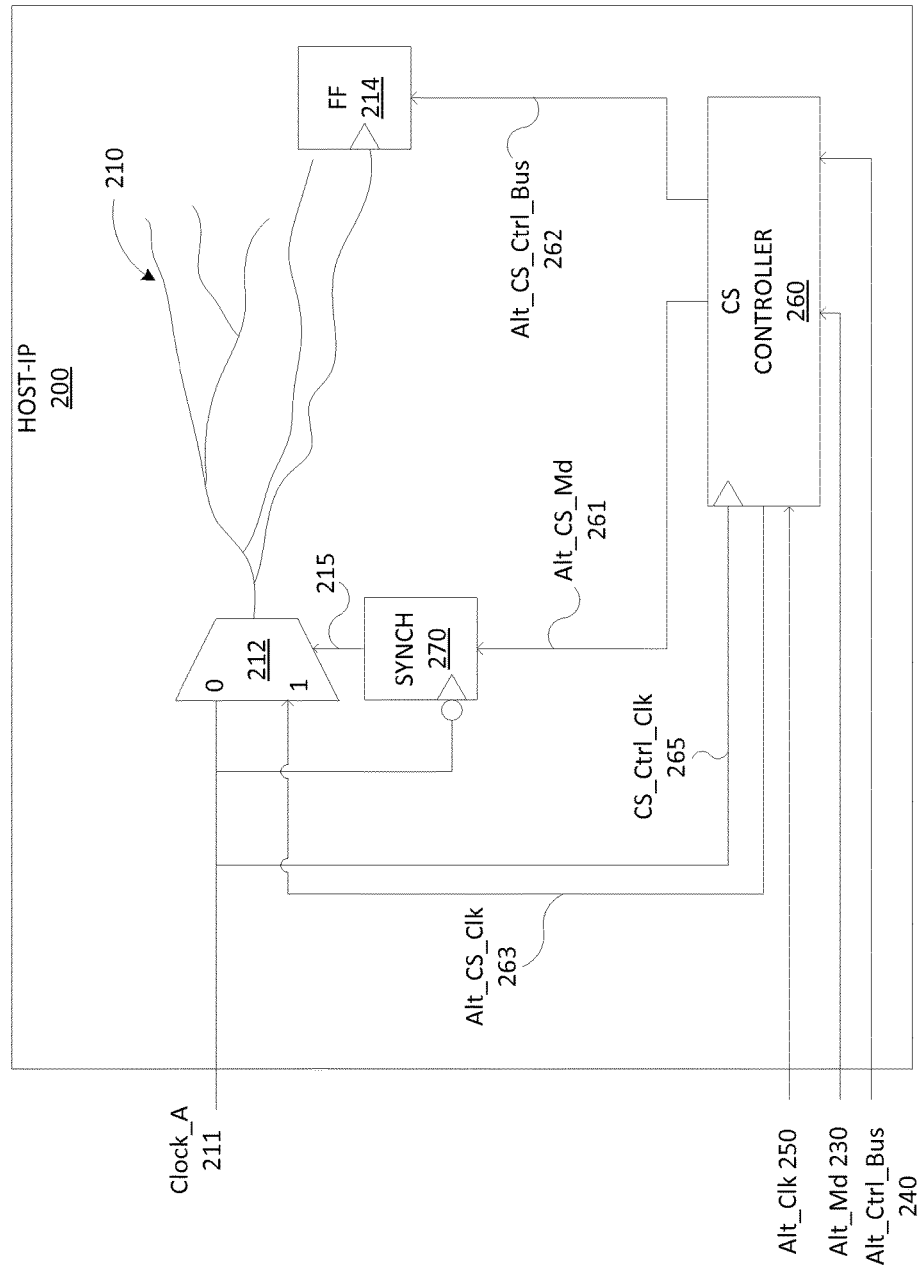
FIG. 2 illustrates a block diagram of an additional device, or circuit according to one example of the present disclosure.

FIG. 2 illustrates a host IP, or circuit 200 configured for deterministic clock stoppage in accordance with the present disclosure. For instance, a deterministic clock stop process may be implemented in circuit 200 to transition from a first mode (broadly, a "functional" mode) prior to commencement of the clock stop process to a second mode (broadly, an "alternative mode") after the completion of the clock stop process. Typically, the second mode comprises a different mode of operation from the first mode, and uses a different clock, or group of clocks. However, in one example, the second mode may comprise the same mode as the first mode, and/or may use the same clock(s). In one example, circuit 200 includes a first clock distribution network 210 having a clock multiplexer 212 ("clock-MUX"). In addition, in one example, a clock-stop (CS) controller 260 is instantiated inside the circuit 200. The CS controller 260 runs on a CS control clock 265 ("CS_Ctrl_Clk"), which may be a functional clock. For example, in FIG. 2 clock 211 ("Clock_A") is re-used as CS_Ctrl_Clk 265. Alternative mode control signals such as alternative-mode signal 230 ("Alt_Md"), alternative-mode control bus signal 240 ("Alt_Ctrl_Bus") and alternative clock signal 250 ("Alt_Clk") are now initially fed into the CS controller 260 instead of the clock-MUX 212. In one example, the three alternative mode control signals 230, 240 and 250 may comprise a scan-mode signal, a scan-enable signal, and a scan clock, respectively, which may comprise the same or substantially similar signals to those shown in FIG. 1.

In any case, the CS controller 260 qualifies all three alternative mode control signals 230, 240, 250 to generate three new combined control signals, alternative-mode CS signal 261 ("Alt_CS_Md"), alternative-mode CS control bus signal 262 ("Alt_CS_Ctrl_Bus") and alternative-mode CS clock signal 263 ("Alt_CS_Clk"), for a deterministic clock stop process. In one example, Alt_CS_Ctrl_Bus signal 262 comprises a scan enable signal (e.g., for enabling a scan mode). In this regard, it should be noted that a scan enable signal for CSSD purposes is typically a single bit control signal. However, in accordance with the present disclosure the alternative-mode control bus signal 240 ("Alt_Ctrl_Bus") and alternative-mode CS control bus signal 262 ("Alt_CS_Ctrl_Bus") may comprise multi-bit wide control signals that are used for configuring one or more circuit elements for various purposes, i.e., depending upon the alternative mode in which the circuit is to be placed after the stoppage of clocks. As such, alternative-mode control bus signal 240 ("Alt_Ctrl_Bus") and alternative-mode CS control bus signal 262 ("Alt_CS_Ctrl_Bus") may broadly be referred to as "mode enable sequences/signals", or "alternative-mode enable sequences/signals". For instance, if it is desired to stop the functional clocks (i.e., the currently used clocks) and commence a real-time monitoring process with another clock or a different set of clocks, it may also be desired to place the circuit 200 in a particular state. Thus, in one example, the configuration of the circuit 200 into a particular state may be accomplished via alternative-mode control bus signal 240 ("Alt_Ctrl_Bus") and alternative-mode CS control bus signal 262 ("Alt_CS_Ctrl_Bus"), as described in greater detail below.

Figure 3:
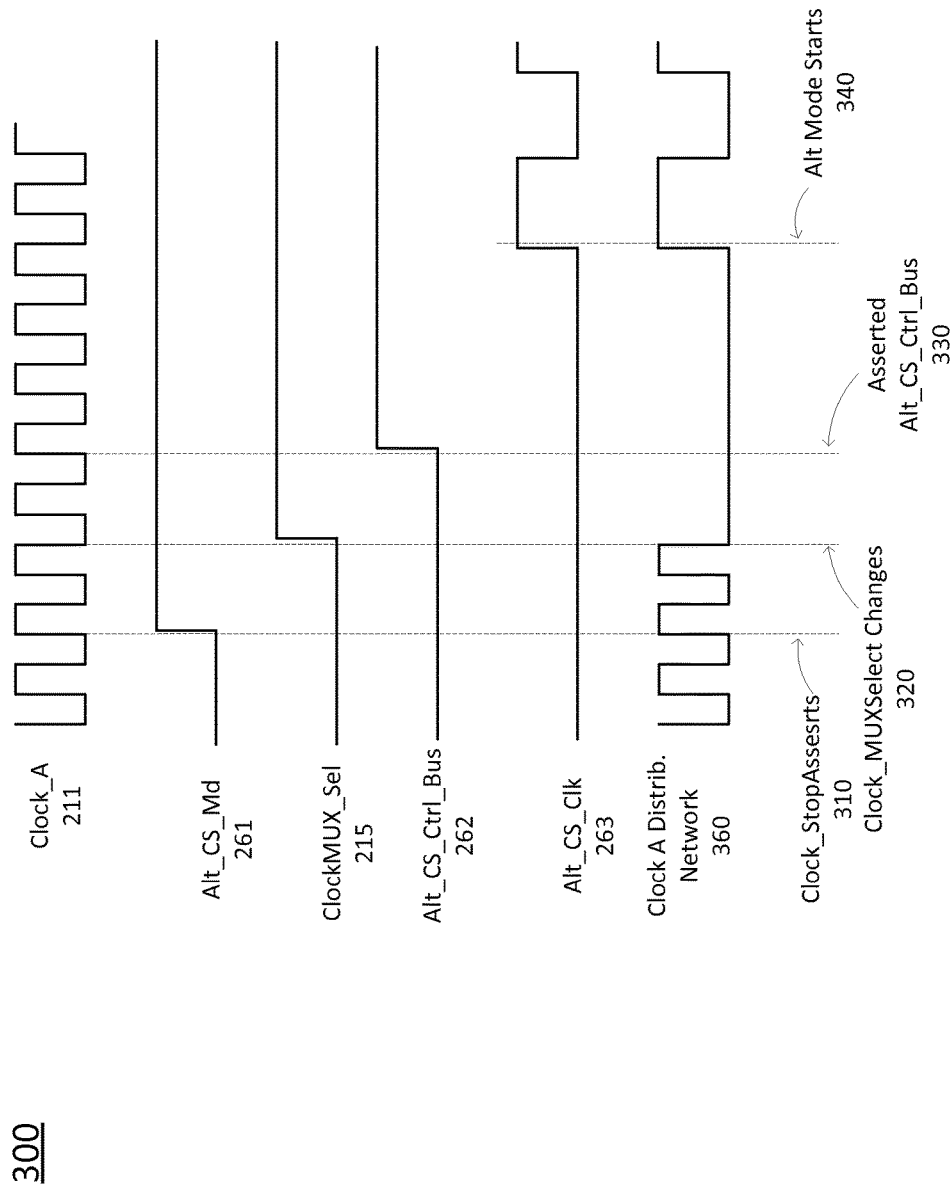
FIG. 3 illustrates a waveform/timing diagram, according to one example of the present disclosure.

To implement a clock-stop process in accordance with the present disclosure, in one example the CS controller 260 implements the sequence of events shown in the waveform/timing diagram 300 of FIG. 3. The clock signal, as received by state elements throughout the distribution network 210, is illustrated by line 360 in FIG. 3. At time 310, Alt_CS_Md 261 is asserted off an edge of the functional clock CS_Ctrl_Clk 265 (which in this case is the same as Clock_A 211). Alt_CS_Md 261 is synchronized to the negative edge of the functional clock using a synchronizer 270. This introduces a half-cycle path between the synchronizer 270's output and the select line 215 of clock-MUX 212, and is the only timing exception introduced in the present example. It should be noted that in another example, the CS controller 260 may instead synchronize to the positive edge of the clock. However, since a clock is being used to stop itself (effectively), synchronizing to the positive edge opens up the possibility that the last clock cycle (that is sent to different FFs) may become dependent on delays on different paths and thus result in varying pulse widths.

After a few cycles (depending on the depth of the synchronizer 270), at time 320 the select line 215 of the clock-MUX 212 changes from '0' to '1', selecting the alternative-mode CS clock input (Alt_CS_Clk 263). In one example, Alt_CS_Clk 263 is kept silent at this time by holding it at a low state (or a high state, depending upon the choice of a system designer). It should be noted that Alt_Clk 250 that is input to the circuit 200 may continue to toggle. However the CS controller 260 takes this clock signal as an input and may qualify it by holding the outgoing signal Alt_CS_Clk 263, in its quiescent state.

After one or more cycles of the CS_Ctrl_Clk 265 signal (which has the same waveform as Clock_A 211 shown in FIG. 3), at time 330 the alternative-mode CS control bus signal 262 ("Alt_CS_Ctrl_Bus"), is asserted. For example, alternative-mode CS control bus signal 262 may configure one or more circuit elements for a particular purpose related to the clock-stoppage. For instance, in one example Alt_CS_Ctrl_Bus 262 may comprise a scan-enable signal to configure all scannable state elements (e.g., FF 214, and other state elements/FFs which are omitted from FIG. 2 for clarity) into one or more scan registers, or scan chains. In this regard, it should be noted that the term flip-flop, or FF,
as used herein is intended to refer to flip-flops as understood to those skilled in the art, as well as to refer broadly to other state or memory elements within a design. The number of cycles of CS_Ctrl_Clk 265 between the assertions of Alt_CS_Md 261 and Alt_CS_En 262 may be hard-coded or user-programmable.

After one or more cycles of CS_Ctrl_Clk 265, at time 340 the CS controller 260 enables alternative-mode clock pulses on the Alt_Clk 250 input of the circuit 200 to flow through to the Alt_CS_Clk 263 signal and the clock distribution network 210. In other words, time 340 represents the commencement of the alternative mode of operation of the circuit 200. Notably, in one example the enablement of clocks on Alt_CS_Clk 263 (e.g., scan-shift clocks) is synchronous to both CS_Ctrl_Clk 265 (also Clock_A 211) and to Alt_Clk 250. In addition, it should be noted that the time delay between 330 and 340 may be held for any duration of time at the discretion of the system designer. For instance, in the case where circuit 200 is used in a CSSD process, once the signal Alt_CS_En 262 is provided, the debug information in the state elements of circuit 200 should remain relatively stable such that the contents can be shift-scanned out at a later time, should the designer so choose. However, a minimum duration should be allowed such that all state elements in the scan chain are guaranteed to receive the Alt_CS_En 262 signal and be configured into the scan-chain mode.

Figure 4:
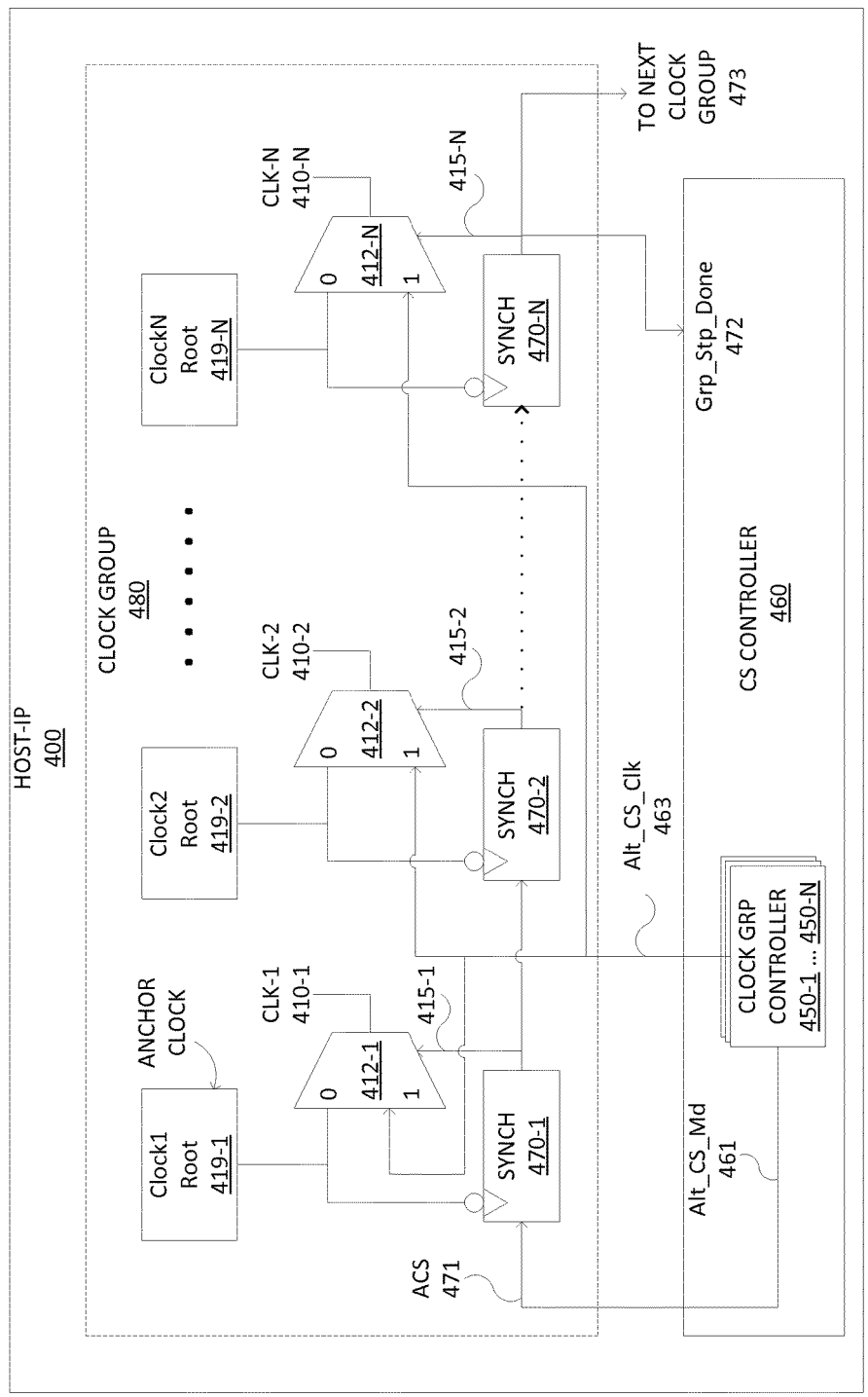
FIG. 4 illustrates a block diagram of another device, or circuit according to one example of the present disclosure.

FIG. 4 illustrates an exemplary host IP, or circuit 400 configured such that multiple clocks within a clock group may be stopped in a hard-wired, predetermined sequence, in accordance with the present disclosure. The circuit 400 is similar to the circuit 200 of FIG. 2, with additional components included to enable stopping of the multiple clocks, e.g., clocks 419-1 through 419-N within the clock group 480.

Typically, large functional blocks, also referred to herein as IPs or circuits, have multiple clock distribution networks, each with a distinct root and clock frequency (and in some cases multiple frequencies). Each such clock distribution network, along with the state elements running off the respective clock, is called a clock domain. In the presence of multiple asynchronous clock domains, time is kept within each domain separately and there is generally no notion of a common time or timescale across clock domains. Communication across clock domains occurs in a "time-less" manner through synchronizers, first-in-first-out ("FIFO") buffers and handshake protocols.

Therefore, stopping clocks "simultaneously" is meaningful only for a single clock domain, but loses its meaning across multiple asynchronous clock domains. In this regard, embodiments of the present disclosure provide a level of determinism in clock-stoppage across multiple clock domains and multiple clock groups. Broadly, determinism refers to the ability to control, at least to a certain extent, the order and timing in which different clocks are stopped. Without determinism, the scope of silicon debug can suffer. As such, the steps, functions and/or operations described in connection with FIG. 4 are applicable to stopping clocks for any collection of asynchronous clock domains.

In accordance with the present disclosure, a clock group includes one or more "clock domains" which will be stopped "together", e.g., in a defined order. In one example, each clock may belong to exactly one clock group. As such, clocks within a group, e.g., clock group 480 may be stopped in a predetermined sequence. For instance, as illustrated in FIG. 4, clock 1, 410-1 ("CLK-1") is to be stopped first, followed by clock 2, 410-2 ("CLK-2") with clock N, 410-N ("CLK-N") last. The first clock to be stopped, CLK-1, 410-1 is referred to herein as the "anchor clock". In accordance with the present disclosure, in one embodiment the highest frequency clock in the clock group is selected as the anchor clock. In addition, in one embodiment the anchor clock is also used as the clock to drive the CS controller 460. Notably, CS controller 460 performs the same or substantially similar functions to CS controller 260 of FIG. 2. In addition, the CS controller 460 is depicted in FIG. 4 as including one or more clock group controllers 450-1 through 450-N, e.g., one for each of N clock groups. This is intended to illustrate that in various examples, the CS controller 460 may control the stopping of clocks in multiple different clock groups.

To implement a clock stop operation for clock group 480 the CS controller 460 asserts an alternative-mode CS signal 461 ("Alt_CS_Md"). Alt_CS_Md 461 is provided to clock group 480 via a virtual port, referred to as "anchor clock stop" or "ACS" 471. Notably, ACS 471 may or may not exist in an actual design and is illustrated in FIG. 4 for clarity. The first clock 419-1 in the clock group 480, the anchor clock, is stopped first. Alt_CS_Md 461 is input to synchronizer 470-1 and is synchronized to the clock 419-1. For example, synchronizer 470-1 may synchronize Alt_CS_Md 461 to the negative edge of clock 419-1. After a few cycles (depending on the depth of the synchronizer 470-1), the Alt_CS_Md 461 signal is passed to the select line 415-1 of the clock-MUX 412-1, which changes from '0' to '1', selecting the alternative-mode CS clock input 463 ("Alt_CS_Clk"). In one example, Alt_CS_Clk 463 is kept silent at this time by the CS controller 460 holding it at a low state (or a high state).

At the same time, Alt_CS_Md 461 is also passed to synchronizer 470-2 where a similar process is repeated to stop clock 419-2, e.g., synchronizing Alt_CS_Md 461 to the negative edge of clock 419-2 and asserting Alt_CS_Md 461 to the select line 415-2 of clock-MUX 412-2 to cause the multiplexer to select the Alt_CS_Clk 463 input on the '1' line. Again, Alt_CS_Clk 463 remains silent at this time by the CS controller 460 holding it at a low state (or a high state). Thereafter, a similar process follows with respect to additional clocks/clock domains. Finally, the last clock, clock 419-N, in clock group 480 is stopped by passing Alt_CS_Md 461 to synchronizer 470-N, synchronizing Alt_CS_Md 461 to the negative edge of clock 419-N, and asserting Alt_CS_Md 461 on the select line 415-N of clock-MUX 412-N to cause the multiplexer to select the Alt_CS_Clk 463 input on the '1' line. Notably, Alt_CS_Clk 463 still remains silent at this time by CS controller 460 holding it at a low state (or a high state).

In addition, the output of synchronizer 470-N (i.e., Alt_CS_Md 461) is returned to the CS controller 460 as a group-stop-done signal 472 ("Grp_Stp_Done") to indicate that all of the clocks in the clock group 480 have been stopped. In one example, the output of synchronizer 470-N is also passed to a next clock group via path 473, in the event that there are multiple clock groups in the circuit 400 to be stopped.

Once all of the clocks in clock group 480 (and any other groups) are stopped in this manner, the CS controller 460 may then perform any one or more processes associated with the alternative mode. For instance, Alt_CS_Clk 463 may be cycled to commence a scan dump process, e.g., as per the sequence of FIG. 3. For example, CS controller 460 may assert a scan-enable signal to configure the state elements/FFs in the circuit 400 into a scan chain and apply a scan clock on Alt_CS_Clk 463 to scan out the contents. However, alternative mode operations of circuit 400 are not limited to scan chain configuration and scan dump. Thus, in one example, CS controller 460 may use any number of signals, include signals on a multi-bit wide bus, e.g., as in the example of FIG. 2, to configure the circuit 400 for alternative mode operations. In addition, although a single alternative-mode CS clock 463 is illustrated in FIG. 4, in another example, different alternative CS mode clocks may be provided to different clock roots within clock group 480.

Figure 5:
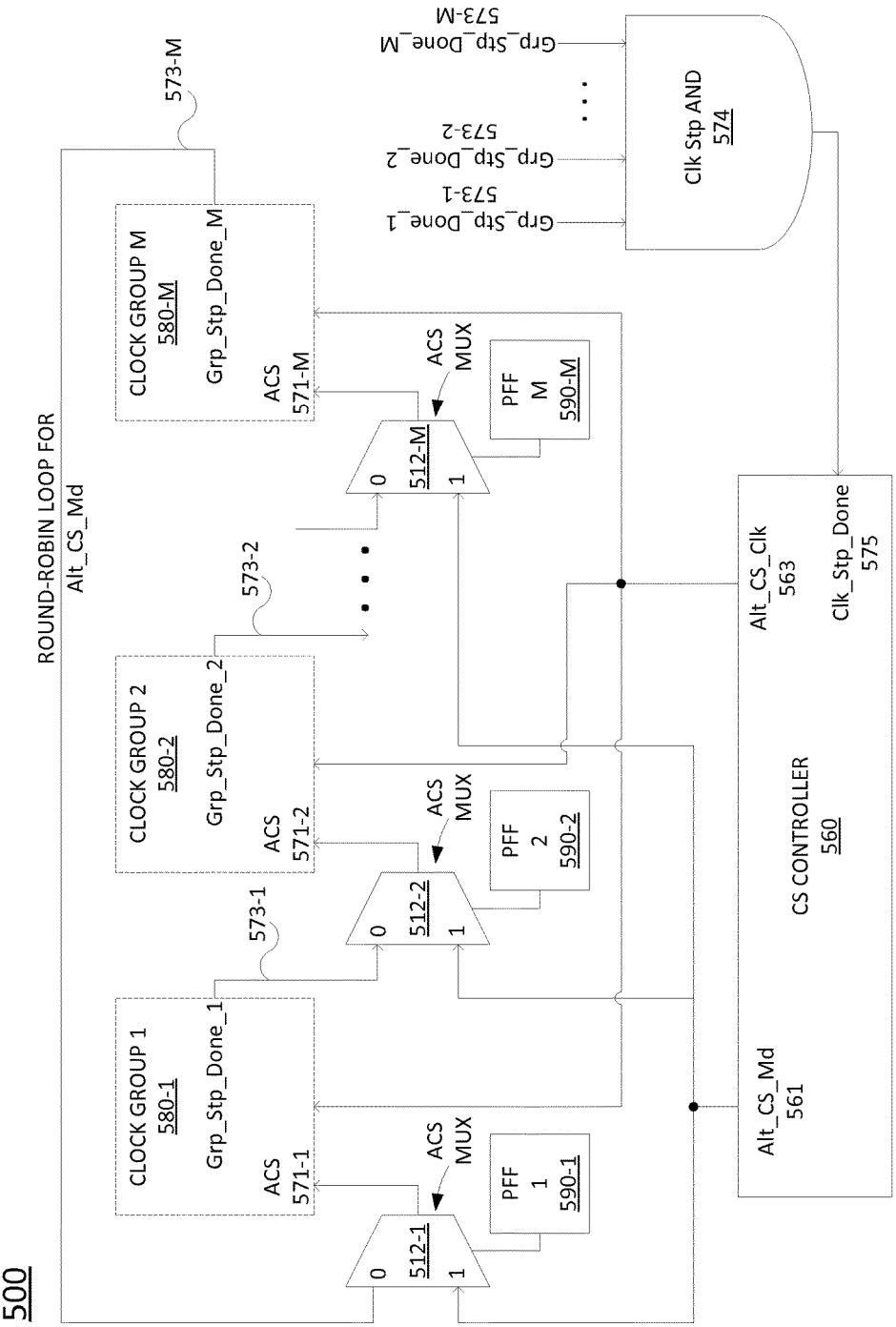
FIG. 5 illustrates a block diagram of still another device, or circuit according to one example of the present disclosure.

FIG. 5 illustrates an additional example of a host IP or circuit 500 with multiple clock groups 580-1 through 580-M to be stopped in a user-selectable order. In particular, the clock group that is to be stopped first is selected by presetting an appropriate programmable FF (PFF) to logic '1' prior to starting a clock-stop and/or scan operation. In accordance with the present disclosure, it is assumed that multiple clocks will not be stopped at the same time (since "same time" is ill defined in the case of multiple clocks). Based on this assumption, only one of the PFFs (590-1 through 590-M) is set to logic '1' and all the other PFFs are set to logic '0'. For example in FIG. 5, if clock group 2 (580-2) is to be stopped first, then PFF 590-2 should be set to logic '1' and all other PFFs should be set to logic '0'. With the "Grp_Stp_Done_1" through "Grp_Stp_Done_M" outputs (573-1 through 573-M) from different clock groups (580-1 through 580-M) connected in a round-robin fashion as shown in FIG. 5, all clocks in all clock-groups are stopped in a sequence that is determined by the PFF that is pre-set to logic '1'.

To further illustrate, setting the PFF 590-2 to logic '1' causes anchor clock stop ("ACS") multiplexer ("ACS-MUX") 512-2 to select the alternative-mode CS signal 561 ("Alt_CS_Md") generated by the CS Controller 560 on the '1' input and to assert the anchor clock stop ("ACS") input 571-2 of the associated clock-group 580-2. The other clock groups e.g., 580-1, 580-M, do not have their "ACS" inputs (e.g., 571-1 through 571-M, excluding 571-2), asserted because the associated ACS-MUXs, e.g., 512-1 and 512-M, continue to select the respective '0' inputs.

To implement a clock stop operation for circuit 500, the CS controller 560 further generates the signal Alt_CS_Md 561, which is broadcast to all the clock-groups 580-1 through 580-M. The clock-group whose PFF is set to logic '1' (e.g., Clock Group 2, 580-2) is the only group whose "ACS" input is asserted as a result of Alt_CS_Md 561 being asserted by the CS Controller 560. Clocks in all other clock groups keep toggling at this time, as they do in normal operation. Once all the clocks within the first group (e.g., in the present example, Clock Group 2, 580-2) have stopped, a group stop done signal 573-2 ("Grp_Stp_Done_2") is asserted in a similar manner to Grp_Stp_Done 472 described above in connection with FIG. 4.

In addition, the signal Grp_Stp_Done_2 573-2 feeds into the '0' input of the "ACS MUX" of the next clock-group in the sequence (e.g., ACS-MUX 512-M for Clock Group M, 580-M, as shown in FIG. 5). Since the PFF 590-M of this clock group is pre-set to logic '0', selecting the '0' input of the ACS-MUX 512-M, the "ACS" input 571-M of Clock Group M is asserted at this time such that clocks in Group M, 580-M, are stopped next in the same or a substantially similar manner as described above. Similarly, a signal 573-M indicating that clocks in Group M, 580-M, have been stopped ("Grp_Stp_Done_M") feeds into the '0' input of the ACS-MUX 512-1 of Clock Group 1, 580-1. Thus, the "ACS" input 571-1 of Group 1, 580-1, is asserted next. In this manner, once all of the clocks in each of the clock groups 580-1 through 580-M have been stopped, the collective group-stop-done signals (573-1 through 573-M), which feed the clock-stop AND gate 574, should all be logic '1'. In turn, this results in a clock-stop-done input signal 575 ("Clk_Stop_Done") of CS controller 560 being asserted, thereby signaling to the CS controller 560 that the clocks in all of the groups have been stopped.

In the above example, only a single PFF is selected. However, in another example, a plurality of PFFs may be selected, e.g., by setting the value stored by each PFF to logic '1'. In this case, clocks in a first sub-set of clock groups, i.e., in each of the selected clock groups may be stopped first, where the Grp_Stp_Done outputs are still passed to the '0' input of the ACS-MUX for the next clock group. Thus, while clock stoppage may first commence simultaneously in some clocks groups, clock stoppage will eventually propagate to all clock groups. In addition, each of the Grp_Stp_Done outputs from the selected clock groups is also passed to the AND gate 574. It should be noted that for purposes of the present disclosure a "sub-set" may comprise a grouping of multiple clock groups as well as a single clock group, or a "sub-set" of one. Therefore, Clk_Stop_Done 575 will still indicate that all clocks in circuit 500 have been stopped only when all Grp_Stp_Done outputs from all clock groups have been activated.

In any case when Clk_Stop_Done 575 is asserted, the CS controller 560 may then perform any one or more processes associated with an alternative mode of operation. For example, the CS controller 560 may perform a scan dump process, e.g., in the same or a substantially similar manner to the sequence of FIG. 3. For example, CS controller 560 may assert a signal to configure the state elements/FFs in the circuit 500 into a scan chain and apply a scan clock to scan out the contents. In another example, CS controller 560 may use any number of signals, include signals on a multi-bit wide bus, e.g., as in the example of FIG. 2, to configure the circuit 500 for alternative mode operations. In addition, one or more alternative-mode clocks, e.g., Alt_CS_Clk 563, may be provided to different clock groups, or to different clock domains within each clock group.

Figure 6:
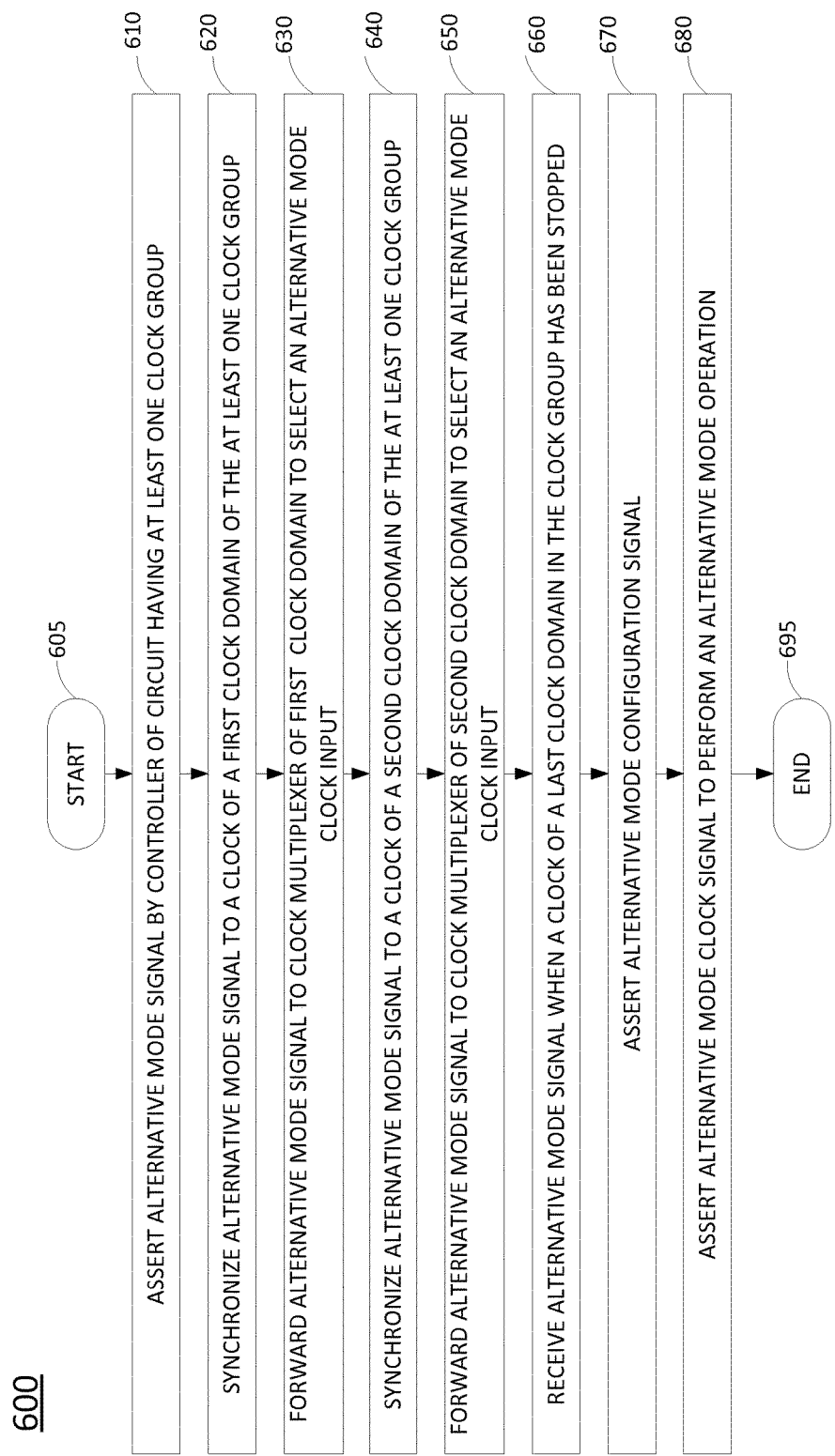
FIG. 6 illustrates a flow diagram of a method for performing a clock-stop process of a circuit, according to one example of the present disclosure.

To further aid in understanding the present disclosure, FIG. 6 illustrates a flow diagram of an exemplary algorithm or method 600 for performing a clock stop process of a circuit. For example, any one or more of the steps, operations or functions of the method 600 may be implemented by a controller of a circuit, e.g., a CS controller as described above in connection with any of FIGS. 2, 4 and/or 5. Method 600 may also be implemented by a general purpose computer having one or more processors, a memory, etc. as illustrated below in FIG. 8, specifically programmed to perform the steps, functions and/or operations of the method 700. For illustrative purposes, the method 600 is described below as being performed by a controller and/or by a controller in conjunction with other circuit elements. The method 600 starts in step 605 and proceeds to step 610.

In step 610, the controller asserts an alternative mode signal. For example, the method may be applied with respect to a circuit, device or host IP that includes at least one clock group. In one example, the at least one clock group may include at least one clock domain. In addition, the at least one clock domain may include a clock and one or more state elements/FFs.

At step 620, the controller synchronizes the alternative mode signal to a first clock domain of the at least one clock group. For instance, the first clock domain may have an associated synchronizer that synchronizes the scan mode signal to a falling edge of the clock of the first clock domain, which may take several clock cycles depending upon the depth of the synchronizer. In one example, the first clock domain comprises a clock domain with the highest frequency clock of the clock domains within the clock group.

At step 630, the controller forwards the alternative mode signal to a clock multiplexer of the first clock domain to select a scan clock input. For example, the controller may forward the alternative mode signal after it is synchronized to the clock in the first clock domain. In one example, the multiplexer may include a select line, for receiving the alternative mode signal, and two inputs: a first input for the clock of the at least a first clock domain and a second input for an alternative mode clock. For instance, the multiplexer may be configured to select one of the two inputs, depending upon the signal on the select line (i.e., the alternative mode signal). Notably, the alternative mode signal on the select line may cause the multiplexer to select the alternative mode clock input. However, the alternative mode clock signal on the alternative mode clock input may be held quiescent at this time (not cycled). For example, the controller may wait to stop other clocks in other clock domains and/or in other clock groups before performing alternative mode operations, e.g., a scan dump or other action. In this regard, it should be noted that following step 630, the method 600 may proceed to step 695, where the method 600 ends, or may proceed to steps 660 or 670. If however, the clock group includes multiple clock domains (and hence multiple clocks), then the method 600 may next proceed to step 640.

At step 640, the controller synchronizes the alternative mode signal to a clock of a second clock domain of the at least one clock group. For example, the second clock domain may include a second synchronizer that operates in the same or a similar manner to the first synchronizer associated with the first clock domain. In one example, the controller forwards the alternative mode signal from the first synchronizer to the second synchronizer at the same time the alternative mode signal is forwarded from the first synchronizer to the multiplexer of the first clock domain.

At step 650, the controller forwards the alternative mode signal that is synchronized to the clock of the second clock domain to a multiplexer of the second clock domain. For example, the alternative mode signal may be received on a select line of the multiplexer, which may cause the multiplexer to switch a selection to an alternative mode clock input. It should be noted that the controller may continue to hold the alternative mode clock quiescent at this time. In addition, the controller may repeat the same or a similar process as described in connection with steps 640 and 650 for any additional clocks in the clock group.

In one example, at step 660 the controller receives back the alternative mode signal to indicate that all clocks within each of the clock domains of the clock group have been stopped. For instance, after a last clock of a last clock domain in the at least one clock group is stopped, the alternative mode signal may be forwarded back to the controller which initiated the scan mode signal at step 610. In one example, following step 660, the method 600 may proceed to step 695, where the method ends. However, in another example, the method 600 may next proceed to step 670.

At step 670, the controller asserts an alternative mode configuration sequence, or signal to configure the circuit for one or more alternative mode operations. In one example, the alternative mode configuration signal comprises a multi-bit wide control signal that is used for configuring one or more circuit elements for various purposes, i.e., depending upon the alternative mode in which the circuit is to be placed after the stoppage of clocks. In one example, the alternative mode configuration signal comprises a scan enable signal to configure a plurality of state elements/FFs in the circuit into at least one scan chain. For example, the circuit may allow the FFs and/or other state elements in the circuit to be switched from a normal operating state into a serial chain or register where the contents of the chain can be scanned out. In one example, the scan chain includes state elements that span multiple clock domains (and multiple clock groups, if present) and the scan enable signal is propagated to all of the state elements.

At step 680, the controller asserts an alternative mode clock signal to commence one or more alternative mode operations. For example, the alternative mode clock signal may comprise a scan clock for outputting the contents of at least one scan chain. For instance, step 670 may comprise the state elements of the circuit being reconfigured from a normal operating mode into the at least one scan chain. Thus, at step 680 cycles of the scan clock signal can be applied to scan, or shift-out the contents of the scan chain, e.g., one per clock cycle. In particular, the previous steps of the method 600 disable the normal operating clocks and prepare the clock multiplexers to pass the alternative mode clock signal (e.g., a scan clock signal) for distribution to the state elements in the respective clock domains. In the case of a scan dump operation, the method 600 may continue to cycle the scan clock signal for as many cycles as necessary or as desired to scan out the contents of state elements that are of interest.

Following step 680, the method 600 proceeds to step 695 where the method 600 ends.

Figure 7:
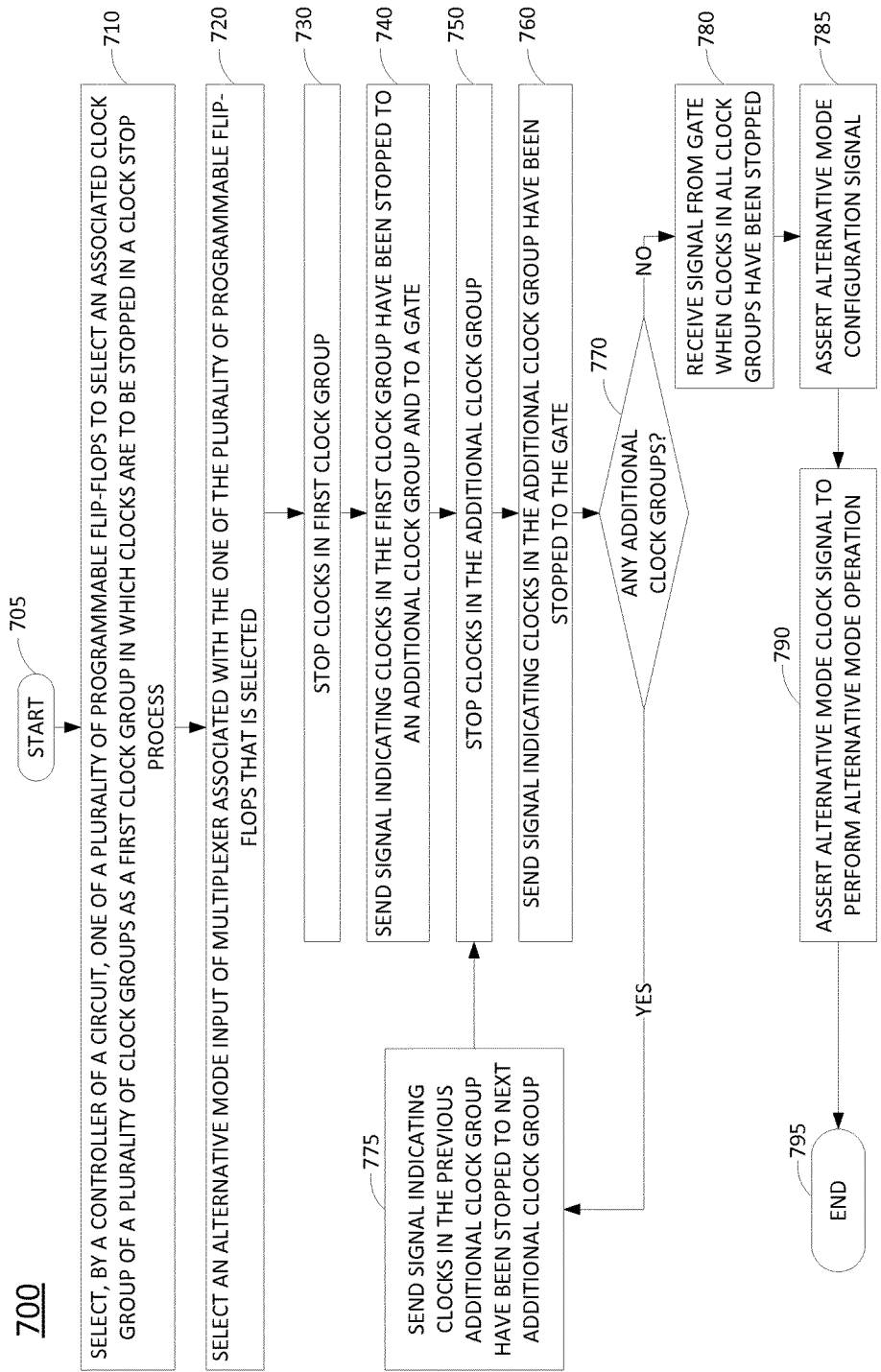
FIG. 7 illustrates a flow diagram of an additional method for performing a clock-stop process of a circuit, according to one example of the present disclosure.

To further aid in understanding the present disclosure, FIG. 7 illustrates a flow diagram of an additional algorithm or method 700 for performing a clock stop process of a circuit. For example, any one or more of the steps, operations or functions of the method 700 may be implemented by a controller of a circuit, e.g., a CS controller as described above in connection with FIGS. 2, 4 and/or 5. Method 700 may also be implemented by a general purpose computer having one or more processors, a memory, etc. as illustrated below in FIG. 8, specifically programmed to perform the steps, functions and/or operations of the method 700. For illustrative purposes, the method 700 is described below as being performed by a controller and/or by a controller in conjunction with other circuit elements. The method 700 starts in step 705 and proceeds to step 710.

At step 710, the controller selects one of a plurality of programmable flip-flops ("PFFs") to select an associated clock group of a plurality of clock groups as a first clock group in which clocks are to be stopped in a clock-stop process. For example, the plurality of clock groups may be connected in a round-robin fashion, where each of the clock groups has an associated PFF. In one example, only one of the PFFs is selected, e.g., by programming its contents to a logic '1', while the other PFFs are held at logic '0' (or vice versa, depending upon the choice of a system designer).

At step 720, the controller selects an alternative mode input of a multiplexer associated with the one of the plurality of programmable flip-flops that is selected. For example, each of the multiplexers may have two inputs, a first for receiving a group-stop-done signal from a different clock group and a second for receiving an alternative mode signal from a controller. In addition, an output line of each of the PFFs may be connected to a select line of the associated multiplexer such that, for each PFF that is selected and which stores a logic '1', the associated multiplexer selects the scan mode input.

At step 730, the controller stops clocks in the first clock group. For example, step 730 may comprise the same or a substantially similar process to that described above in connection with steps 620-660 of the method 600.

At step 740, following the stoppage of clocks in the first clock group, the controller sends or forwards a signal (e.g., a "group-stop-done" signal) indicating that stoppage of clocks in the clock group is completed to a next clock group in the round-robin loop. For instance, as described above, each clock group may comprise an associated multiplexer having a first input for a group-stop-done signal from a different clock group. The controller may also send this signal to a logic gate to aggregate with signals from other clock groups. This aspect is described in greater detail below in connection with step 780.

At step 750, the controller stops a clock in the next/additional clock group, e.g., in the same or a similar manner as described above in connection with step 730.

At step 760, the controller sends a signal indicating that clocks in the additional clock group (the "current" clock group) have been stopped to the logic gate.

At step 770, if there are additional clock groups in the circuit, the method 700 proceeds to step 775 wherein the controller sends a signal, to a next clock group, indicating that clocks in the current clock group have been stopped. Following step 775, the method 700 returns to step 750 where the process is repeated for the next additional clock group. However, if at step 770 there are no additional clock groups remaining, then the method 700 may proceed to step 795 where the method 700 ends, or may alternatively proceed to step 780.

At step 780, the controller receives a signal from the gate indicating that clocks in all clock groups have been stopped. For example, the gate may comprise an AND logic gate with inputs for receiving "group-stop-done" signals from each of the respective clock groups. Accordingly, only when all of the inputs are logic '1' will the gate pass a logic '1' signal to the controller. If any of the "group-stop-done" signals remains logic '0', indicating that the clock stop process has not completed for a clock group, then the output of the gate remains logic '0'.

At step 785, the controller asserts an alternative mode configuration sequence, or signal to configure the circuit for one or more alternative mode operations. In one example, the alternative mode configuration signal comprises a multi-bit wide control signal that is used for configuring one or more circuit elements for various purposes, i.e., depending upon the alternative mode in which the circuit is to be placed after the stoppage of clocks. Accordingly, once the controller is apprised at step 780 that all of the clocks in all of the clock groups have been stopped, the controller may determine that the circuit is in a state in which it is safe to begin alternative mode operations. In one example, the alternative mode configuration signal comprises a scan enable signal to configure a plurality of state elements/FFs in the circuit into a scan chain and the alternative mode operations include a scan dump process. In such case, step 785 may comprise configuring the plurality of state elements from multiple clock domains and from multiple clock groups into at least one scan chain.

At step 790, the controller asserts an alternative mode clock signal to commence one or more alternative mode operations. For example, steps 785 and 790 may comprise the same or substantially similar operations to those described above in connection with steps 670 and 680 of the method 600. In one example, the alternative mode clock signal comprises a scan clock for outputting the contents of at least one scan chain.

Following step 790, the method 700 proceeds to step 795 where the method 700 ends.

It should be noted that although not specifically specified, one or more steps, functions or operations of the respective methods 600 and 700 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 6 or FIG. 7 that recite a determining operation or involve a decision do not necessarily require that both branches of the determining operation be practiced. In other words, one of the branches of the determining operation can be deemed as an optional step.

Figure 8:
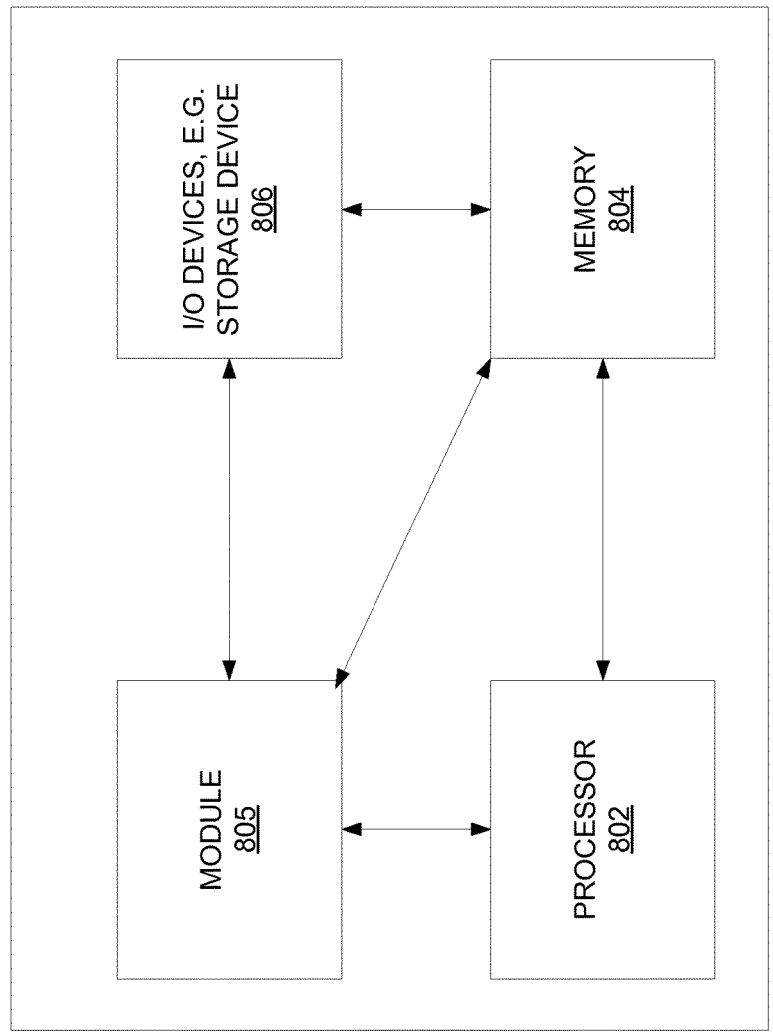
FIG. 8 illustrates a high level block diagram of a general purpose computer, or a computing device suitable for use in performing the functions described herein.

FIG. 8 depicts a high-level block diagram of a general-purpose computer suitable for use in performing the functions described herein. As depicted in FIG. 8, the system 800 comprises one or more hardware processor elements 802 (e.g., a central processing unit (CPU), a microprocessor, or a multi-core processor), a memory 804, e.g., random access memory (RAM) and/or read only memory (ROM), a module 805 for performing a clock-stop process of a circuit, and various input/output devices 806 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer-readable instructions pertaining to the method(s) discussed above can be used to configure a hardware processor to perform the steps, functions and/or operations of the above disclosed methods. In one embodiment, instructions and data for the present module or process 805 for performing a clock-stop process of a circuit (e.g., a software program comprising computer-executable instructions) can be loaded into memory 804 and executed by hardware processor element 802 to implement the steps, functions or operations as discussed above in connection with the exemplary methods 600 and/or 700. Furthermore, when a hardware processor executes instructions to perform "operations", this could include the hardware processor performing the operations directly and/or facilitating, directing, or cooperating with another hardware device or component (e.g., a co-processor and the like) to perform the operations. In this regard, it should be noted that in various examples, controllers described above, such as CS controllers 260, 460 and 560, may be implemented as one or more hardware processor elements 802 and/or system 800.

In addition, in one example the processor executing the computer readable or software instructions relating to the above described method(s) can be perceived as a programmed processor or a specialized processor. As such, the present module 805 for performing a clock-stop process of a circuit (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

The present disclosure may also be implemented in whole or in part by a tunable IC, e.g., a PLD and/or FPGA. More specifically, a programmable logic device (PLD) is a general-purpose device that can be programmed by a user to implement a variety of selected functions. One type of PLD is a Field Programmable Gate Array (FPGA), which typically includes an array of configurable logic blocks (CLBs) and a plurality of input/output blocks (IOBs). The CLBs are individually programmable and can be configured to perform a variety of logic functions on a few input signals. The IOBs can be configured to drive output signals from the CLBs to external pins of the FPGA and/or to receive input signals from the external FPGA pins. The FPGA also includes a programmable interconnect structure that can be programmed to selectively route signals among the various CLBs and IOBs to produce more complex functions of many input signals. The CLBs, IOBs, and the programmable interconnect structure are programmed by loading configuration data into associated memory cells that control various switches and multiplexers within the CLBs, IOBs, and the interconnect structure to implement logic and routing functions specified by the configuration data to implement a user design in the FPGA. An FPGA may also include other programmable and non-programmable resources. As such, the devices and/or algorithms shown and described above in connection with FIGS. 1-2 and 4-7 may be implemented in a plurality of CLBs that perform equivalent logic operations of any one or more components of devices or circuits 100, 200, 400 and 500 and/or steps, functions or operations of the algorithms/methods 600 and 700 described above. In one example, the computing device 800 may generate the necessary configuration data/instructions to configure an FPGA to perform the various functions as disclosed above.

While the foregoing describes various examples in accordance with one or more aspects of the present disclosure, other and further embodiment(s) in accordance with the one or more aspects of the present disclosure may be devised without departing from the scope thereof, which is determined by the claim(s) that follow and equivalents thereof. Claim(s) listing steps do not imply any order of the steps. Trademarks are the property of their respective owners.

What is claimed is:

1. A circuit, comprising:
    a plurality of clock groups including a first clock group, the first clock group including:
        a first clock domain;
        a first clock multiplexer; and
        a first synchronizer;
    a plurality of programmable flip-flops; and
    a controller, wherein the controller is configured to select at least one of the programmable flip-flops for choosing a sub-set of the plurality of clock groups including at least the first clock group for which clocks are to be stopped first during a clock stop process, and to generate an alternative clock signal and initiate the clock stop process of the circuit by sending an alternative mode signal to the first synchronizer, wherein the first synchronizer is configured to synchronize the alternative mode signal to a clock of the first clock domain, and wherein the first synchronizer is further configured to output, to a select line of the first clock multiplexer, the alternative mode signal that is synchronized to the clock of the first clock domain, wherein the select line of the first clock multiplexer is for selecting from between an input of the first clock multiplexer for the clock of the first clock domain and an alternative mode clock input of the first clock multiplexer for the alternative clock signal generated by the controller.

2. The circuit of claim 1, wherein the first clock domain comprises a plurality of state elements, wherein the plurality of state elements is configurable into a scan chain when the controller asserts a scan enable signal.

3. The circuit of claim 2, wherein the controller is further configured to apply an alternative mode clock signal on the alternative mode clock input of the first clock multiplexer to output a content of the scan chain.

4. The circuit of claim 1, wherein the first clock group further comprises:
    a second clock domain;
    a second clock multiplexer; and
    a second synchronizer, wherein the second synchronizer is configured to receive the alternative mode signal from the first synchronizer and to synchronize the alternative mode signal to a clock of the second clock domain, and wherein the second synchronizer is further configured to output, to a select line of the second clock multiplexer, the alternative mode signal that is synchronized to the clock of the second clock domain, wherein the select line of the second clock multiplexer is for selecting from between an input of the second clock multiplexer for the clock of the second clock domain and an alternative mode clock input of the second clock multiplexer for the alternative mode clock signal from the controller.

5. The circuit of claim 4, wherein the first clock domain and the second clock domain comprise a plurality of state elements, wherein the plurality of state elements is configurable into a scan chain when the controller asserts a scan enable signal, and wherein the controller is further configured to assert an alternative mode clock signal on the alternative mode clock input of the first clock multiplexer and on the alternative mode clock input of the second clock multiplexer to output a content of the scan chain.

6. The circuit of claim 4, wherein the controller is further configured to receive the alternative mode signal when a clock of a last clock domain of the first clock group has been stopped, to indicate that all clocks of the first clock group have been stopped.

7. The circuit of claim 6, wherein the controller is further configured to assert an alternative mode configuration signal and an alternative mode clock signal when the alternative mode signal is received by the controller.

8. The circuit of claim 1, wherein each of the plurality of clock groups comprises an output port for outputting a signal to indicate that clocks within each of the plurality of clock groups have been stopped.

9. The circuit of claim 8, further comprising:
    a gate configured to output to the controller a signal indicating that all clocks within each of the plurality of clock groups have been stopped when the gate receives the signal from each of the plurality of clock groups indicating that the clocks within each of the plurality of clock groups have been stopped.

10. The circuit of claim 9, wherein the plurality of clock groups comprises a plurality of state elements, wherein the plurality of state elements is configurable into a scan chain when the controller asserts a scan enable signal, wherein the controller is further configured to assert the scan enable signal when the controller receives the signal from the gate indicating that all clocks within each of the plurality of clock groups have been stopped.

11. A method for performing a clock-stop process of a circuit, the method comprising:
    initiating, by a controller of the circuit, the clock-stop process of the circuit, by providing an alternative mode signal, wherein the circuit comprises a clock group, the clock group including at least a first clock domain;
    synchronizing the alternative mode signal to a clock of the first clock domain;
    forwarding the alternative mode signal that is synchronized to the clock of the first clock domain to a clock multiplexer of the first clock domain to select an alternative mode clock input of the clock multiplexer of the first clock domain;
    sending, by the controller, an alternative mode configuration signal to the circuit;
    asserting, by the controller, an alternative mode clock signal on the alternative mode clock input of the clock multiplexer of the first clock domain to perform an alternative mode operation;
    synchronizing the alternative mode signal to a clock of a second clock domain of the clock group; and
    forwarding the alternative mode signal that is synchronized to the clock of the second clock domain to a clock multiplexer of the second clock domain to select an alternative mode clock input of the clock multiplexer of the second clock domain.

12. The method of claim 11, wherein the alternative mode configuration signal comprises a scan enable signal, wherein the scan enable signal configures a plurality of state elements in the circuit into a scan chain, and wherein the alternative mode operation comprises scanning out a content of the scan chain.

13. The method of claim 12, wherein the scan chain includes state elements of the first clock domain and state elements of the second clock domain of the clock group.

14. The method of claim 11,
    wherein the forwarding further comprises asserting an alternative mode clock signal on the alternative mode clock input of the clock multiplexer of the second clock domain.

15. The method of claim 14, further comprising:
    forwarding the alternative mode signal back to the controller when a clock of a last clock domain in the clock group has been stopped, to indicate that all clocks in the clock group have been stopped.

16. The method of claim 15, wherein an alternative mode configuration signal and the alternative mode clock signal are asserted after the alternative mode signal is received by the controller.

* * * * *